United States Patent [19]

Forbes et al.

[11] Patent Number: 4,497,502
[45] Date of Patent: Feb. 5, 1985

[54] RECUMBENT TRICYCLE

[75] Inventors: Robert C. Forbes, Sun Valley, Calif.; John VanderKam, Dayton, Ohio

[73] Assignee: Huffy Corporation, Dayton, Ohio

[21] Appl. No.: 462,489

[22] Filed: Jan. 31, 1983

[51] Int. Cl.³ .............................................. B62D 9/02
[52] U.S. Cl. .............................. 280/281 LP; 280/240; 280/269; 280/282
[58] Field of Search ................. 280/281 LP, 282, 240, 280/263, 267, 269

[56] References Cited

U.S. PATENT DOCUMENTS

| | | | |
|---|---|---|---|
| 1,599,223 | 7/1926 | Epps | 280/269 |
| 2,207,161 | 7/1940 | Roe | 280/269 |
| 3,311,388 | 3/1967 | Ryan et al. | 280/282 |
| 3,960,392 | 6/1976 | Read | 280/282 |
| 4,198,072 | 4/1980 | Hopkins | 280/282 |
| 4,279,429 | 7/1981 | Hopkins et al. | 280/281 LP |
| 4,332,395 | 6/1982 | Zech | 280/269 |
| 4,359,231 | 11/1982 | Mulcahy | 280/281 LP |

OTHER PUBLICATIONS

"Funcycle!", *Bicycle Journal*, Nov., 1982, p. 11.

*Primary Examiner*—Joseph F. Peters, Jr.
*Assistant Examiner*—Kenneth R. Rice
*Attorney, Agent, or Firm*—Biebel, French & Nauman

[57] ABSTRACT

A recumbent tricycle including a frame, twin rear wheels pivotally mounted to the frame and steerable by a pair of levers pivotally mounted to the frame on either side of a passenger seat. The rear wheels are oriented substantially vertically and are attached to hubs inclined inwardly toward the frame to create a cambered effect which maintains the rear wheels in a forward-facing position as the tricycle moves in a rectilinear path. The single front wheel is preferably driven by a pedal crank assembly mounted rearwardly of the front wheel and forwardly of the passenger seat.

8 Claims, 6 Drawing Figures

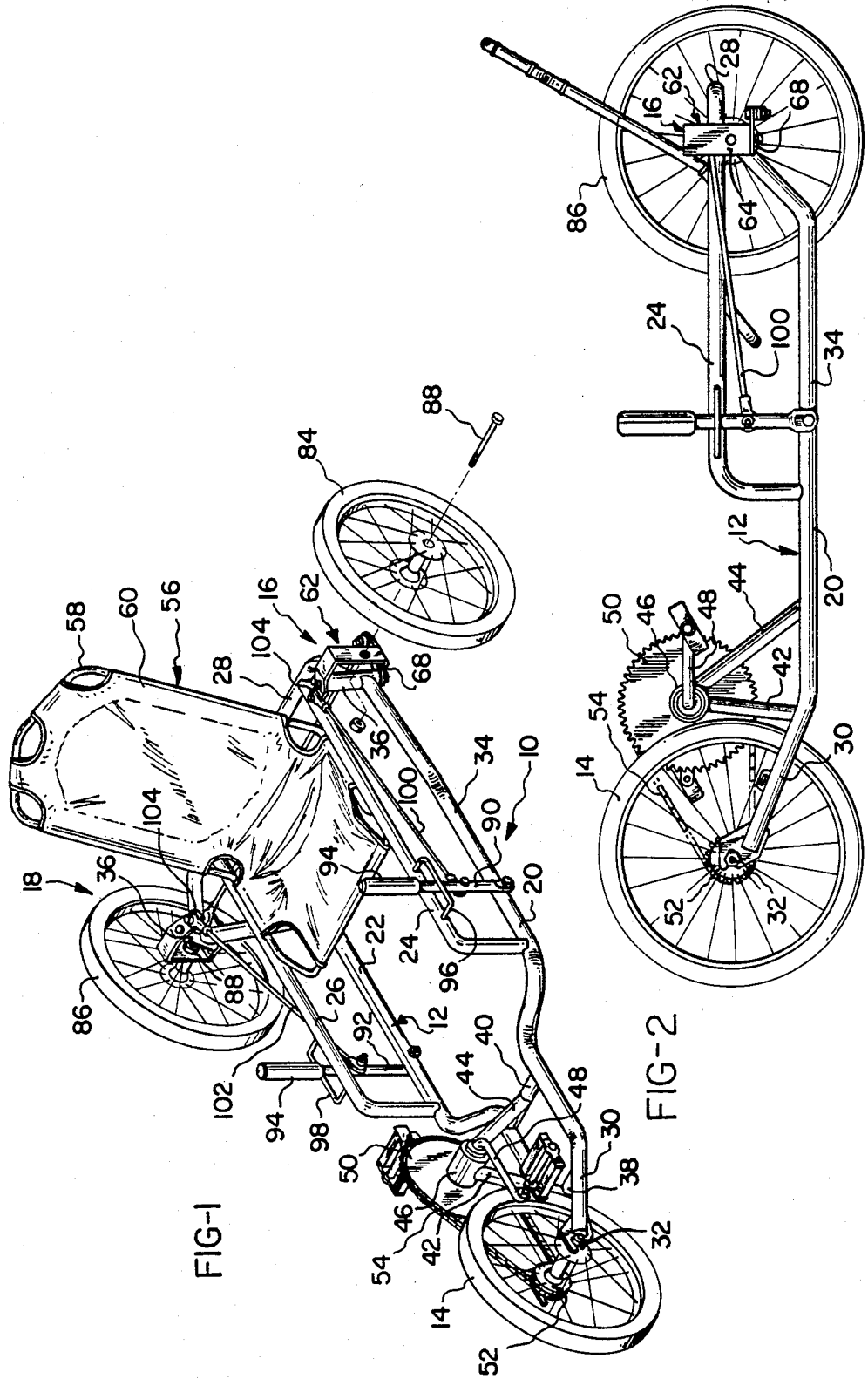

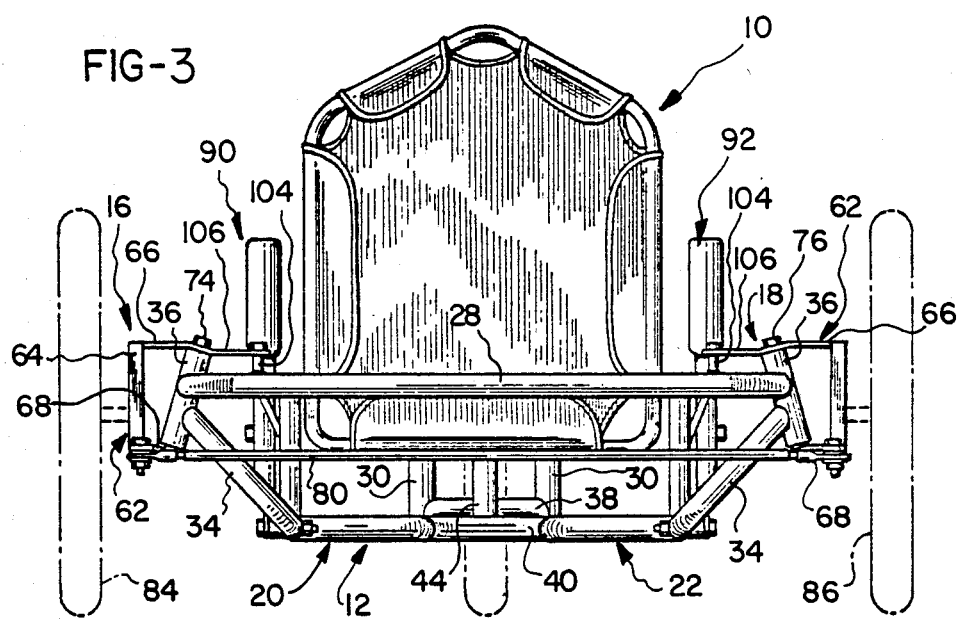

RECUMBENT TRICYCLE

BACKGROUND OF THE INVENTION

The present invention relates to tricycles, and more particularly to recumbent tricycles having steerable twin rear wheels.

Of passenger-propelled vehicles, tricycles provide a vehicle which is more stable than a bicycle and has a turning radius which is usually smaller than that of a four-wheeled vehicle. Furthermore, unlike bicycles, a three-wheeled passenger-powered vehicle may include a relatively comfortable seat which provides support for the back of the operator and allows the operator to ride in a recumbent position. Such tricycles are known as recumbent tricycles.

One type of recumbent tricycle consists of a frame, a single pedal-driven rear wheel, and twin steerable front wheels. One disadvantage of this design is that the single rear wheel affords only a single point of support of the rear of the vehicle, which typically bears the bulk of the weight of the operator, and therefore such vehicles often become unstable during sharp turns. Another disadvantage is that the drive mechanism, typically a pedal-driven chain and sprocket drive, requires that a sprocket chain pass beneath the operator's seat to the rear wheel, necessitating a higher seat and hence a higher center of gravity, which reduces stability.

A different type of recumbent tricycle includes a frame mounting a single front wheel and steerable twin rear wheels. The advantage of this design is that the twin wheels each bear a portion of the higher rear load and also provide two spaced apart points of support to the rear of the vehicle which increases the stability of the vehicle when turning.

For example, in the Mulcahy U.S. Pat. No. 4,359,231, a tricycle is disclosed having a single front wheel and two steerable rear wheels. The rear wheels are rotatably mounted to an axle which is pivotally mounted to the frame of the tricycle at a central rearward portion thereof. A pair of steering handles are rigidly mounted to the frame on either side of the passenger seat, and the passenger turns the vehicle by grasping the handles and leaning, thereby causing the rear axle to pivot and point the rear wheels away from a forward facing direction.

A disadvantage with that type of design is that the tricycle lacks a positive steering mechanism which turns either the front or rear wheels in a predictable or gradual manner to effect a predetermined rate of turning. Another disadvantage with this type of steering mechanism is that it would be difficult for the operator to pedal such a vehicle and at the same time maintain the rear wheels in a turning configuration by leaning to the side. Furthermore, it would be difficult for the operator to adjust his weight sufficiently rapidly to vary the direction of the tricycle from a sharp turn in one direction to a sharp turn in the opposite direction. Indeed, such rapid shiftings of the body weight of the operator might cause the tricycle of that design to lose stability.

Accordingly, there is a need for a recumbent tricycle which can support an operator comfortably and have twin steerable rear wheels which can be turned gradually and predictably by the operator so that sharp turns can be effected without significantly affecting the stability of the vehicle. There is also a need for a recumbent tricycle in which the front wheel is powered, thereby obviating the need to raise the operator seat to provide clearance for a rear wheel drive train to pass thereunder. It is also desirable to fabricate a tricycle having the aforementioned characteristics such that it includes a relatively lightweight frame and relatively easily constructed steering and propulsion components.

SUMMARY OF THE INVENTION

The present invention provides a recumbent tricycle having a pair of steerable rear wheels which are turned by a pair of levers pivotally mounted to the frame on either side of the passenger seat. The tricycle is propelled by a chain and sprocket crank mechanism which drives the front wheel and thereby eliminates the need to raise the passenger seat—and hence the center of gravity of the vehicle—to provide clearance for a drive train to extend beneath the seat to the rear wheels. Furthermore, the rear wheels of the tricycle of the present invention are mounted to the frame by cambered hinges which maintain the rear wheels in a forward-facing direction and thereby impart a stability to the vehicle as it travels in a rectilinear path.

The tricycle of the present invention consists of a frame having a passenger seat, a non-steerable front wheel rotatably mounted to the frame forwardly of the seat, a pedal crank assembly for rotating the front wheel, a pair of rear wheel assemblies mounted to the frame rearwardly and on either side of the seat, and a pair of steering levers mounted to the frame on either side of the seat for forward and rearward pivotal movement, joined to the rear wheel assemblies by link rods. The rear wheel assemblies each include a substantially vertically oriented rear wheel rotatably mounted to a hinge attached to the frame having a pivotal axis inclined inwardly from the vertical toward the frame. The hinges each includes a link arm projecting inwardly of the pivotal axis of the hinge and attached to the associated link arm. The steering levers may then be pivotally displaced in alternate forward and rearward positions so that the rear wheels are pivoted to turn the tricycle in a direction corresponding to the rearwardly pivoted lever. That is, to effect a left turn, for example, the operator pivots the levers such that the left-hand lever is pivoted rearwardly and the right-hand lever is pivoted forwardly. An advantage of this type of steering structure is that the operator is forced by the resultant positioning of his hands to lean into the turn, thereby maintaining the proper stability of the tricycle. Of course, the operator will be forced to lean to the right when turning the vehicle to the right, thereby leaning into the turn.

To provide strength yet maintain a relatively lightweight vehicle, the frame is made of tubular members and includes a pair of lower rails having an upwardly inclined forward portion rotatably mounting the front wheel, a divergent portion passing below and outwardly of the seat and terminating in an upwardly inclined section which supports the hinges, a rear rail extending between and supporting the hinges at upper portions thereof, and a pair of upper side rails, each extending upwardly from one of the lower side rails and joined to the rear rail. Thus, the frame is generally low slung and provides a low center of gravity when carrying the operator, thereby increasing stability. The steering levers preferably are pivotally mounted to the lower side rails, and the seat is mounted to the upper side rails. The link rods are mounted to the steering levers at a position intermediate the pivotal mounting and the portion grasped by the operator to provide a mechanical advantage to the operator when turning the wheels, thereby reducing the effort required to steer the vehicle.

Accordingly, it is an object of the present invention to provide a recumbent tricycle having a pair of rear wheels which are positively steerable by hand-operated pivoting steering levers; a tricycle which does not require a raised seat to accommodate a drive train and, therefore, has a relatively low center of gravity; a tricycle with cambered wheel mountings to add stability to the vehicle as it travels in a rectilinear path; and a tricycle with a lightweight yet strong frame which can be easily constructed of relatively inexpensive materials.

Other objects and advantages of the invention will be apparent from the following description, the accompanying drawings and the appended claims.

BRIEF DESCRIPTION OF THE DRAWINGS

FIG. 1 is a perspective view of the recumbent tricycle of the present invention in which a left rear wheel is exploded therefrom;

FIG. 2 is a side elevation of the tricycle of FIG. 1 with the left rear wheel removed therefrom;

FIG. 3 is a rear elevation of the tricycle of FIG. 1 in which the wheels are shown in phantom;

DESCRIPTION OF THE PREFERRED EMBODIMENT

Figure 4A:
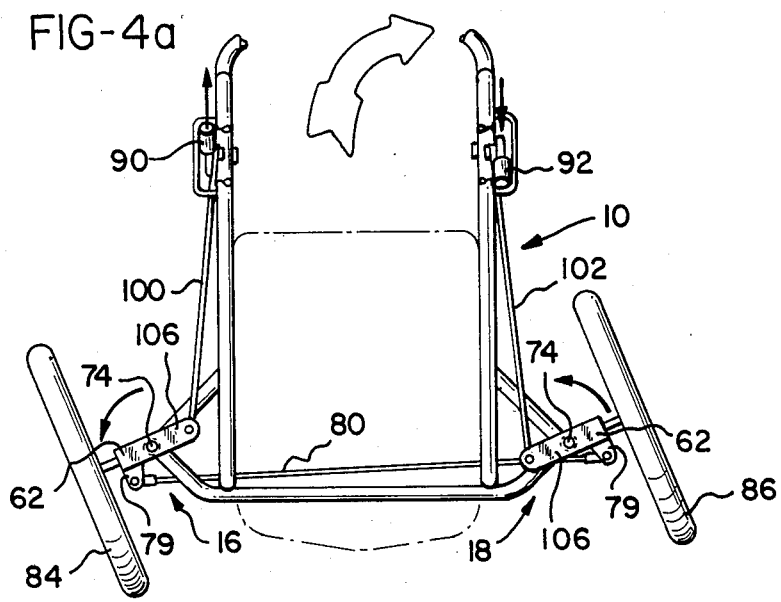
FIGS. 4a and 4b are details showing the tricycle of FIG. 1 in which the steering levers are oriented to steer the vehicle to the right and to the left, respectively.

As shown in FIGS. 1 and 2, the recumbent tricycle of the present invention, generally designated 10, includes a frame 12, front wheel 14, and left and right rear wheel assemblies 16,18, respectively. The frame 12 includes left and right lower rails 20,22, respectively, a left and right upper side rails 24,26, respectively, and a rear rail 28.

The lower rails 20,22 each include a forward, upwardly inclined portion 30 which supports the front wheel 14 at the axle 32 thereof, and a rearward portion 34 which diverges outwardly from the forward portion and extends rearwardly and upwardly to a hinge housing 36 at a lower portion thereof which forms a component of the rear wheel assemblies 16,18. The upper side rails 24,26 are attached at forward ends thereof to the lower rails 20,22, respectively, and extend rearwardly to the rear rail 28. The rear rail is generally U-shaped, and extends between the hinge housing to the upper portions thereof, as best shown in FIGS. 2 and 3.

Thus, the contour of the lower rails 20,22 of the frame 12 provides a low-slung appearance concomitant with low center of gravity. The rearwardly protruding rear rail 28 acts as a rear bumper, protecting the operator of the tricycle 10.

The frame 12 includes forward cross members 38,40 which extend between the lower rails 20,22 and in turn support struts 42,44, respectively. Struts 42,44 are joined by a crank housing 46 which mounts a bicycle pedal crank assembly 48, of a type well-known in the art, having a drive sprocket 50. Drive sprocket 50 is operatively joined to a driven sprocket 52 by a sprocket chain 54. Driven sprocket 52 is mounted on the axle 32 of the front wheel 14.

The upper side rails 24,26 support an operator seat 56 consisting of a tubular frame 58 over which is attached a fabric 60 such as nylon.

As best shown in FIGS. 1 and 3, each of the rear wheel assemblies 16,18 includes a cylindrical hinge housing 36 which mounts a rear wheel bracket 62 for pivotal movement relatively thereto. Each rear wheel bracket 62 includes a vertical member 64, an upper flange 66, and a lower flange 68 (also shown in FIGS. 4a and 4b).

Figure 5:
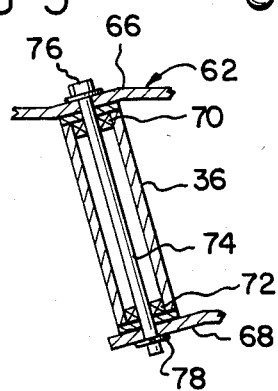
FIG. 5 is a detail showing a rear wheel hinge housing and wheel bracket in section and a hinge pin in full.

As shown in FIG. 5, each hinge housing 36 consists of a hollow cylinder having bearings 70,72 pressed into upper and lower ends thereof, which support a hinge pin 74 for rotation. The hinge pin 74 passes through the upper flange 66 and lower flange 68, thereby mounting the rear wheel bracket 62 for pivotal movement relative to the housing 36. The pin 74 includes a formed head 76 and a lock fastener 78 of well-known design so that it is retained within the housing 36. It is understood that other types of attaching arrangements may be employed to mount the rear wheel bracket to the housing 36 for relative pivotal movement without departing from the scope of the invention.

The lower flanges 68 of the rear wheel assemblies 16,18 include studs 79 joined by a tie rod 80 which is pivotally mounted to the lower flange at its ends by pivot connections 82 of well-known design. Left and right rear wheels 84,86 are rotatably mounted to the vertical members 64 of the rear wheel brackets 62 by nut and bolt combinations 88. Thus, the rear wheels 84,86 are maintained in parallel alignment relative to each other by the tie rod 80, regardless of their radial orientation relative to their respective hinge pins 74.

Left and right steering levers 90,92, respectively, are pivotally mounted at lower ends thereof to the left and right lower rails 20,22, forwardly of the passenger seat 56 and rearwardly of the pedal crank assembly 48. The upper portions of the steering levers 90,92 include hand grips 94, and the forward and rearward pivotal movement of the levers is limited by retaining bars 96,98, mounted to the upper side rails 24,26, respectively.

Left and right link rods 100,102, respectively, are pivotally mounted at their forward ends to the left and right steering levers 90,92, respectively, at a location midway between the ends of the levers. The rearward ends of the link rods 100,102 are pivotally mounted to the upper flanges 66 of the left and right rear wheel assemblies 16,18 by pivot joints 104 of well-known design. As best shown in FIG. 3, the pivot joints 104 are attached to the upper flanges 66 at inboard ends thereof, the portion extending inwardly from the hinge pin 74 acting as a link arm 106 to provide the operator of the tricycle 10 with a mechanical advantage when operating the steering levers 90,92 and to rotate the wheel brackets counter to the direction of link rod 100,102 movement.

As shown in FIG. 3, the hinge housings 36 are inclined inwardly toward the frame 12 such that the hinge pins 74 define pivotal axes for pivotal movement of the rear wheel brackets 62 to provide a camber effect to the rear wheels 84,86. Preferably, this angle of inclination of the pivotal axis is approximately 10° from the vertical. This camber effect forces the rear wheels 84,86 to assume a forward-facing orientation such that, absent a turning force imparted by the operator, they will guide the tricycle 10 in a substantially rectilinear path.

Figure 4B:
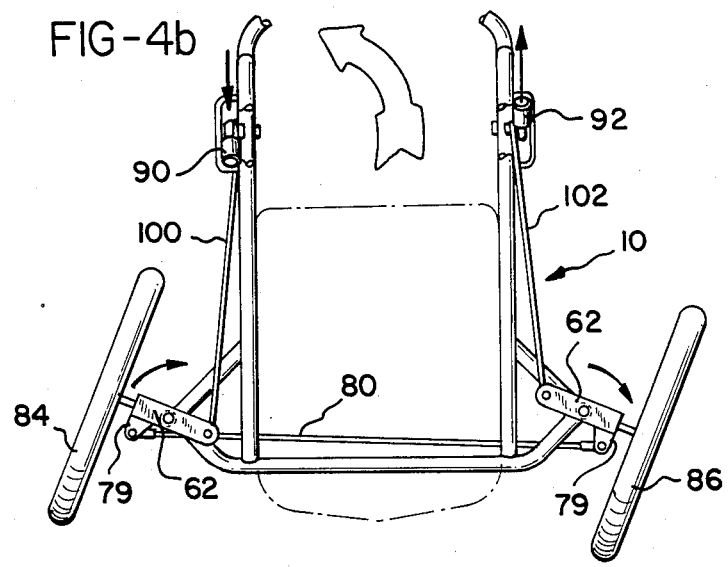

The operation of the tricycle 10 is best shown in FIGS. 1, 4a and 4b. To propel the tricycle 10, the operator sits in the seat 56, places his feet on the pedals of the pedal crank assembly 48, then pedals in a manner similar to other pedal-driven cycles. The rotation of the pedal crank assembly 48 rotates the drive sprocket 50 which transmits its rotational movement through the sprocket chain 54 to the driven sprocket 52 to rotate the front wheel 14. Since the crank assembly 48 is positioned on the frame 12 adjacent the driven wheel, there is no need for expensive and cumbersome power transmission means to pass under the seat 56, necessitating the raising of the seat and hence the raising of the center of gravity, thereby reducing the stability of the tricycle 10.

To steer the tricycle 10 to the right, as shown in FIG. 4a, the operator grasps the left and right steering levers 90,92 and simultaneously pushes the left steering lever forwardly and pulls the right steering lever rearwardly. This pivotal movement of the steering levers 90,92 is transmitted through the link rods 100,102 to the rear wheel brackets 62. Since the link rods 100,102 are attached to the wheel brackets 62 at the inboard ends of the link arms 106 on a side of the pivot pins 74 opposite the rear wheels 84,86, the forward movement of the left steering lever 90 and link rod 100 causes the rear wheel bracket to rotate in a counterclockwise direction about pivot pin 74, thereby orienting the left rear wheel to point to the left.

Similarly, the rearward movement of the right steering lever 92 and link rod 102 causes the rear wheel bracket 62 of the right rear wheel assembly 18 to rotate in a counterclockwise direction, thereby turning the right rear wheel 86 to the left. The rear wheels 84,86 are maintained in parallel to each other by the tie rod 80 extending between the studs 79 of the rear wheel brackets 62. Continued driving rotation of the front wheel 14 causes the vehicle to advance, and the leftward orientation of the rear wheels 84,86 causes the rear of the tricycle 10 to swing to the left, thereby turning the nose of the tricycle to the right, thus effecting a right turn.

Conversely, to effect a left turn, the left steering lever 90 is pulled rearwardly by the operator and the right steering 92 is pushed forwardly. This movement is transmitted to the rear wheel brackets by the link rods 100,102 and rotates the brackets in a clockwise direction, thereby orienting the rear wheels 84,86 to point to the right. The rear of the tricycle 10 thus swings to the right, thereby pointing the nose of the tricycle to the left.

It should be noted that, since the operator must pull the riht steering lever 92 rearwardly to effect a right turn, and the left steering lever 90 rearwardly to effect a left turn, while at the same time pushing forwardly on the opposite levers in each case, the operator is forced to lean into the turn, which results in increased stability. Thus, the attachment of the link rods 100,102 to the rear wheel brackets at a location inboard of the pivotal axes of the rear wheel assemblies 16,18 is preferable to attaching the link rods to the rear wheel brackets immediately adjacent the rear wheels 84,86 and on the same side of the hinge pins 74. To do so would result in the operator having to effect a right turn by pushing the right steering lever forwardly, or a left turn by pushing the left steering lever forwardly, causing him to lean out of the turn and thereby decrease the stability of the tricycle 10 when turning.

The components of the tricycle 10 are all well-known in the cycle art. The frame 12 preferably is made of a relatively strong tubular steel, but can be made of aluminum or metal alloys. The wheels 14,84,86 may be bicycle-type pneumatic tires.

While the form of apparatus herein described constitutes a preferred embodiment of the invention, it is to be understood that the invention is not limited to this precise form of apparatus and that changes may be made therein without departing from the scope of the invention.

What is claimed is:

1. A tricycle comprising:

a front wheel;

a frame having a passenger seat and including a pair of lower rails, each having an upwardly-inclined forward portion rotatably and nonsteerably mounting said front wheel, a divergent portion passing below and outwardly of said seat and terminating in an upwardly inclined section, a rear rail extending between said divergent portions and having an arcuate shape protruding rearwardly of said frame thereby providing a rear bumper therefor, and a pair of upper side rails, each extending upwardly from a different one of said lower side rails to said rear rail;

a pair of rear wheel assemblies mounted to said frame rearwardly of and on either side of said seat, each including a substantially vertically oriented rear wheel, hinge means attached to said rear rail at a top portion thereof and to one of said divergent portions of said lower rails at a bottom portion thereof and having a pivotal axis inclined 10° from the vertical inwardly toward said frame and mounting said rear wheel for rotational movement about a horizontal axis and pivotal movement about said pivotal axis;

each of said hinge means including a housing attached to said rear rail and said lower rail, a rear wheel bracket pivotally mounted to said housing to rotate about said pivotal axis and including a vertical member rotatably mounting an associated one of said rear wheels, an upper flange pivotally attached to said housing at an upper portion thereof and including a link arm extending inwardly from said pivotal axis, and a lower flange pivotally attached to said housing and including a stud projecting outwardly from said pivotal axis;

a tie rod attached to and extending between said studs of said hinge means whereby said rear wheels are at all times oriented substantially parallel to each other;

steering means including a pair of levers mounted to different ones of said lower rails on either side of said seat for forward and rearward pivotal movement, a pair of link rods operatively joining each of said levers to one of said link arms on a common side of said frame, such that said levers may be displaced in alternate forward and rearward positions wherein said rear wheels are pivoted to turn said tricycle in a direction corresponding to said rearwardly pivoted lever; and means for rotating said front wheel including crank means mounted to said frame forwardly of said seat and rearwardly of said rear wheel.

2. A recumbent tricycle comprising:

a frame including a pair of lower rails, each having a forward, upwardly inclined portion and a divergent portion teminating in an upwardly inclined section, a pair of upper side rails, each extending upwardly and rearwardly from a different one of said lower side rails, and a rear rail extending between and attached to said upper side rails;

a nonsteerable front wheel rotatably attached to said frame at said upwardly inclined portion;

means for driving said front wheel including a crank assembly mounted on said frame rearwardly of said front wheel;

a seat mounted on said frame rearwardly of and remote from said front wheel, said seat positioned above and inwardly of said divergent portion;

a pair of rear wheel assemblies mounted on said frame adjacent to either side of said seat and rearwardly thereof, each including a substantially vertically oriented rear wheel and hinge means attached at a lower end thereof to said upwardly inclined section of one of said lower rails, and at an upper end thereof to an end of said rear rail, said hinge means having a pivotal axis inclined inwardly toward said frame and mounting said rear wheel for rotational movement about a horizontal axis and pivotal movement about said pivotal axis, said rear wheel assemblies being operatively interconnected such that said rear wheels pivot about said pivotal axes in unison; and steering means including a pair of levers pivotally mounted on said frame on either side of said seat for forward and rearward movement, a pair of link arms, each projecting inwardly from a different one of said hinge means, and a pair of link rods operatively joining said levers to said link arms, such that said levers may be pivotally displaced in alternate forward and rearward positions wherein said rear wheels are pivoted to turn said tricycle in a direction corresponding to said rearwardly pivoted lever.

3. The tricycle of claim 2 wherein said levers are each pivotally mounted to a different one of said lower side rails.

4. The tricycle of claim 3 wherein said seat is mounted to said upper side rails forwardly of said rear rail.

5. The tricycle of claim 4 wherein said rear rail is generally arcuate in shape, extending rearwardly of said frame, thereby providing a rear bumper therefor.

6. The tricycle of claim 5 wherein said pivotal axes of said hinge means are inclined 10° from the vertical toward said frame.

7. The tricycle of claim 6 wherein each of said hinge means comprises:

a housing attached to said rear rail and said lower rail;

a rear wheel bracket pivotally mounted to said housing to rotate about said pivotal axis and including a vertical member rotatably mounting an associated one of said rear wheels, an upper flange pivotally attached to said housing at an upper portion thereof and including said link rod, and a lower flange pivotally attached to said housing and including a stud projecting outwardly from said pivotal axis; and a tie rod attached to and extending between said studs whereby said rear wheels are at all times oriented substantially parallel to each other.

8. A recumbent tricycle comprising:

a frame including a pair of lower rails, each having a forward, upwardly inclined portion and a divergent portion terminating in an upwardly inclined section, a pair of upper side rails, each extending upwardly and rearwardly from a different one of said lower side rails, and a rear rail extending between and attached to said upper side rails;

a nonsteerable front wheel rotatably attached to said forward, upwardly inclined portion of said frame;

means attached to said frame for driving said front wheel;

a passenger seat attached to said frame rearwardly of said driving means, said seat positioned inwardly of and above said divergent portion;

a pair of rear wheel assemblies attached to said frame rearwardly of and on either side of said seat, each of said assemblies including a rear wheel and hinge means, supporting said rear wheel, attached at a lower end thereof to said upwardly inclined section of one of said lower rails, and at an upper end thereof to an end of said rear rail, said hinge means having a pivotal axis inclined inwardly toward said frame and mounting said rear wheel for rotation about a horizontal axis and pivotal movement about said pivotal axis, said rear wheel assemblies being operatively interconnected such that said rear wheels pivot about said pivotal axes in unison; and steering means including a pair of levers pivotally attached to said frame on either side of said seat for forward and rearward movement, and link means attaching each of said levers to a corresponding one of said hinge means, such that said levers may be pivotally displaced in alternate forward and rearward positions wherein said rear wheels are pivoted to turn said tricycle in a direction corresponding to said rearwardly pivoted lever.

* * * * *